United States Patent
Williams et al.

(10) Patent No.: US 10,254,832 B1
(45) Date of Patent: Apr. 9, 2019

(54) MULTI-ITEM SELECTION USING EYE GAZE

(71) Applicant: Microsoft Technology Licensing, LLC, Redmond, WA (US)

(72) Inventors: Shane Williams, Seattle, WA (US); Andrew D. Wilson, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/718,995

(22) Filed: Sep. 28, 2017

(51) Int. Cl.
*G06F 3/01* (2006.01)
*G06F 3/0482* (2013.01)
*G06T 13/80* (2011.01)

(52) U.S. Cl.
CPC ............ *G06F 3/013* (2013.01); *G06F 3/0482* (2013.01); *G06T 13/80* (2013.01)

(58) Field of Classification Search
CPC . H04L 67/42; G06F 3/017; A61B 3/11; A61B 3/113
See application file for complete search history.

(56) References Cited

U.S. PATENT DOCUMENTS

| | | | |
|---|---|---|---|
| 9,304,586 B2 | 4/2016 | Nister et al. | |
| 9,626,072 B2 | 4/2017 | Feit et al. | |
| 2008/0192990 A1* | 8/2008 | Kozakaya | G06K 9/00221 |
| | | | 382/117 |
| 2012/0105486 A1 | 5/2012 | Lankford et al. | |
| 2013/0300653 A1* | 11/2013 | Lewis | A61B 3/113 |
| | | | 345/156 |
| 2015/0220157 A1 | 8/2015 | Marggraff et al. | |
| 2016/0179336 A1* | 6/2016 | Ambrus | G02B 27/017 |
| | | | 715/768 |
| 2017/0285337 A1* | 10/2017 | Wilson | A61B 3/113 |

OTHER PUBLICATIONS

"Eye Gaze—say it with your eyes!", Retrieved From<<http://www.inclusive.co.uk/articles/eye-gaze-say-it-with-your-eyes-a490>>, Dec. 9, 2013, 1 Page.

"Zyteq—Eye Gaze", Retrieved From<<http://www.zyteq.com.au/selection-guide/eye_gaze>>, Retrieved Date: Jul. 17, 2017, 7 Pages.

Mackenzie, I. Scott., "Evaluating Eye Tracking Systems for Computer Input", In Book Gaze Interaction and Applications of Eye Tracking: Advances in Assistive Technologies, Oct. 31, 2011, 22 Pages.

Sengupta, et al., "GazeTheKey: Interactive Keys to Integrate Word Predictions for Gaze-based Text Entry", In Proceedings of the 22nd International Conference on Intelligent User Interfaces Companion, Mar. 13, 2017, 4 Pages.

* cited by examiner

*Primary Examiner* — Abbas I Asdulselam
(74) *Attorney, Agent, or Firm* — Jeffrey L. Ranck; Ranck IP Law

(57) ABSTRACT

Representative embodiments disclose mechanisms for selection of items using eye tracking. One or more primary selection targets are presented to the user. When the user selects a primary selection target, secondary selection targets are presented in close proximity to the primary selection target, either before or after selection of the primary selection target. The secondary selection targets are animated in a way that moves them away from the primary selection target. The user's eye naturally follows the secondary selection target of interest, if any, producing a vector having a magnitude and a direction. The magnitude and direction of the vector are used to identify which, if any, of the secondary selection targets are intended ty the user.

20 Claims, 14 Drawing Sheets

MULTI-ITEM SELECTION USING EYE GAZE

FIELD

This application relates generally to eye gaze tracking. More specifically, this application relates to selecting an item using eye gaze tracking and improving the precision of item selection.

BACKGROUND

The advent of relatively low cost eye gaze tracking subsystems have increased the utilization of eye gaze tracking in user interfaces as a replacement for mouse, keyboard, gesture and other types of input. Gaze dwell (i.e., tracking when a user is focusing on an item) is the technique mostly used to trigger events such as button clicking. However, the eye gaze signal tends to be noisy and imprecise. Thus, item selection in a user interface using eye gaze tracking tends to be quite error prone and the system can easily misinterpret the user's intent. Additionally, the user can inadvertently trigger a selection, button click, and so forth. Thus, eye gaze tracking has yet to find wide acceptance.

It is within this context that the present embodiments arise.

DETAILED DESCRIPTION

Figure 1:
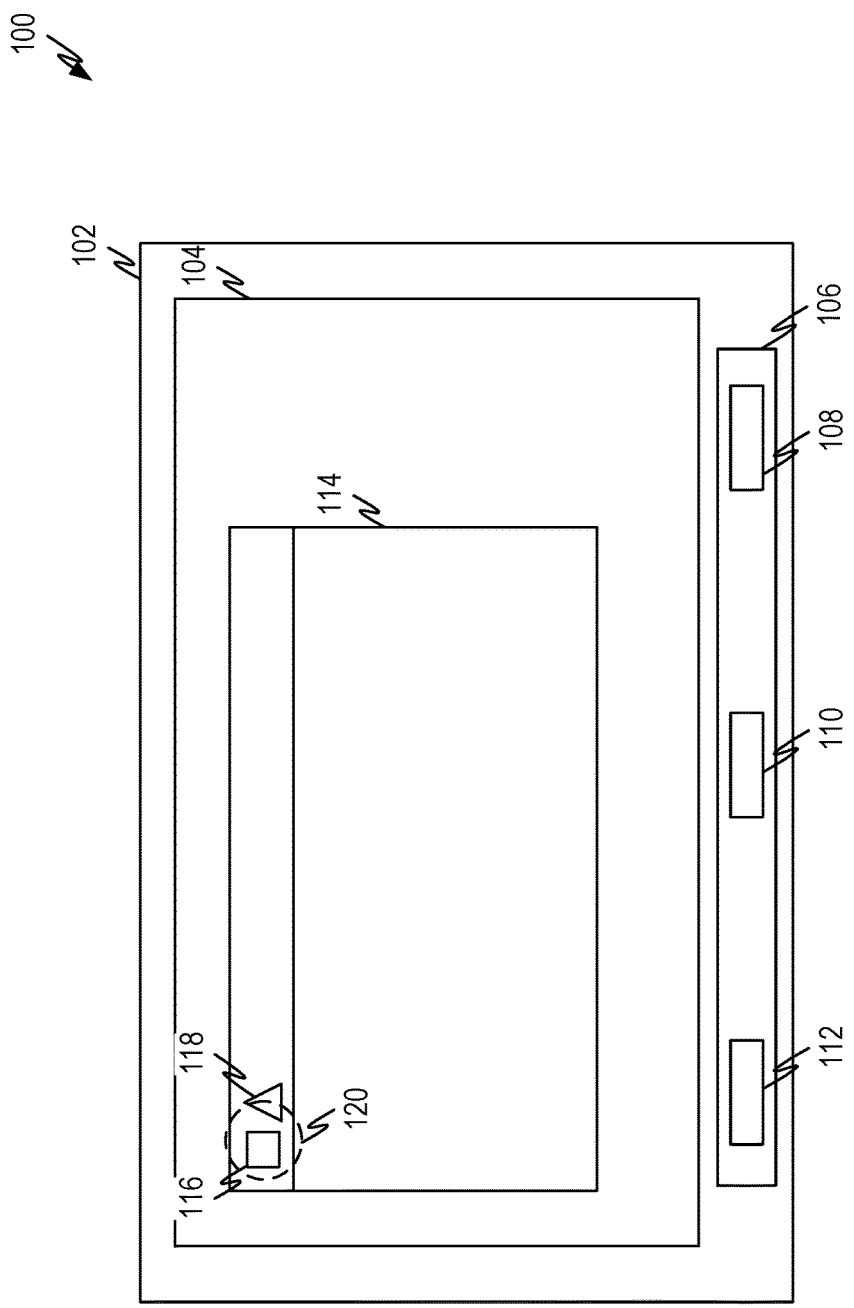
FIG. 1 illustrates an example display with eye gaze tracking.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

An eye gaze subsystem produces a signal showing a measurement of where a user is looking and thus can be used to identify the location a user is looking at on a display. As mentioned in the background, the eye gaze signal is noisy and imprecise. Traditional approaches to using the eye gaze signal to select user interface items has been error prone in numerous ways such as a false alarm triggered by a user dwelling on something for too long, the system making an error in measuring where a user is looking and triggering the wrong user interface element and so forth. The present disclosure solves the technical problem of accurate selecting of screen elements, such as user interface elements, even in the face of a noisy signal from an eye gaze subsystem.

Although numerous embodiments are disclosed herein, a basic embodiment renders an primary selection target on the screen of a user device. The system identifies user gaze selection of the primary selection target and, responsive to the user gaze selection of the primary selection target, the system renders secondary selection targets. The secondary selection targets are rendered within a threshold distance of the primary selection target. In some embodiments, the threshold distance is set such that the secondary selection targets are likely to be rendered in the central or paracentral region of the user's vision. In other embodiments, the threshold distance can be a fixed distance.

With both the initial and secondary selection targets within the user's field of view, the system animates the secondary selection targets to move them from their initial location to a new location outside a second threshold distance from the initial location. In some embodiments, the animation comprises smoothly moving the secondary selection targets from their initial locations to their new locations. In other embodiments, the animation comprises first removing the secondary selection targets from the screen so that they cannot be viewed and then rendering the secondary selection targets at their new locations. Removing and rendering the secondary selection targets can comprise using a fade-out and fade-in animation, respectively.

As the secondary selection targets move from their initial locations to their new locations, the user's eye naturally follows the secondary selection target the user desires. This creates a vector out of the eye tracking subsystem that has a direction and a magnitude. The magnitude can be used to identify whether a user intended to select a secondary selection target. The direction can be matched to the animation direction of each secondary selection targets and the matching secondary selection target identified as the one the user wants to select.

Variations employed in different embodiments are discussed below and can be used for multi-item selection over time where a user enters a string of numbers, letters, words and so forth. Thus, the description below shows how the selection/animation methodologies can be used in representative keyboards and other multi-item selection schemes.

Description

FIG. 1 illustrates an example display system 100 with eye gaze tracking. A display system 100 comprises a display 102 with a screen area 104. The screen area 104 is used to present information as described herein to facilitate eye gaze selection of items, such as user interface elements. The system can be used to select anything that can be displayed on a screen such as text, graphics, icons, symbols, and other screen elements. In this disclosure, the representative example of icons or text will be used, but any items can be used with the embodiments disclosed herein.

In the simple example of FIG. 1, the screen area 104 comprises a window 114 such as might be used to display information associated with an operating system, a program, an app, or other such executable items. The window comprises elements 116 and 118 that are displayed on the screen area 104.

The system 100 an eye tracking subsystem 106. Such a subsystem 106 typically comprises one or more light sources and one or more cameras. These elements are identified by 108, 110, and 112. A typical arrangement might have two or more infrared light sources and an infrared camera, although different eye tracking subsystems can comprise any number of light sources, cameras and so forth.

Figure 2:
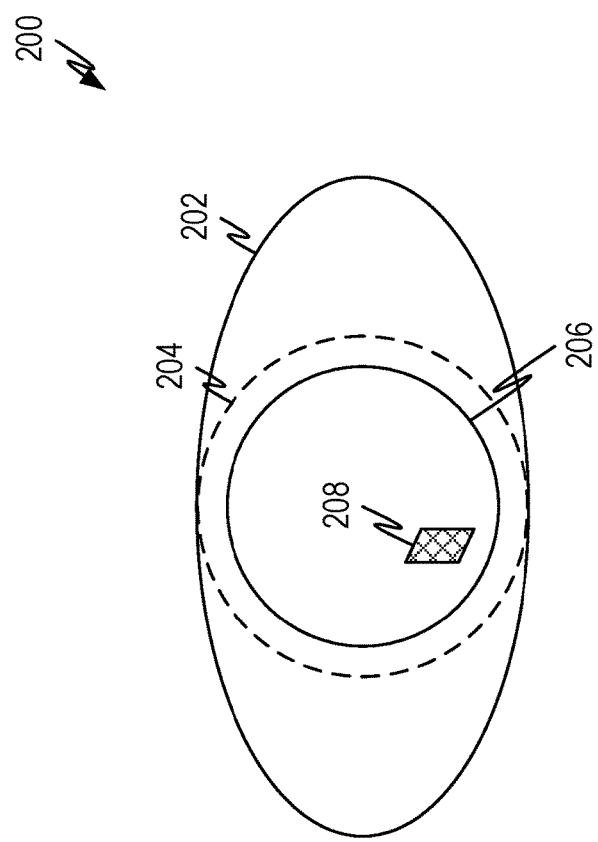
FIG. 2 illustrates a representation of an eye, eye glint which can be used by an eye gaze tracking subsystem to identify where a user is looking.

The light sources are typically used to emit light in such a way that a glint and/or pupil of a user's eye can be detected as illustrated in FIG. 2. Turning for a moment to FIG. 2, this figure contains a representation of an eye, eye glint which can be used by an eye gaze tracking subsystem to identify where a user is looking.

As shown in FIG. 2, an eye image 202 has iris 204 and pupil 206. In infrared light, the pupil is often seen as a bright reflection. In addition, the illumination causes glint 2008 (as well as optional additional Purkinje reflections). Images of one or both eyes are captured and the patterns of glint, reflections, and/or the pupil are evaluated to identify where the user is looking. After calibration, the system can produce a signal that identifies where on a screen the user is looking.

Returning now to FIG. 1, the user focus (e.g., where the user is looking) is illustrated by dashed circle 120. The location where the user is looking can be correlated to what is being displayed at that location and an item on the screen identified where a user is looking. The eye gaze subsystem produces a signal that identifies where the user is looking. This can be evaluated over time to identify whether a user is staring at a particular element for a period of time (e.g., dwell time). This dwell time can be used to identify selection of an initial or primary selection target as described below.

In addition, the eye gaze signal over time can be used to create a movement vector having an origin (starting location), magnitude (distance), and direction (angular direction). This can be used to identify selection of a secondary selection target as described below.

Figure 3:
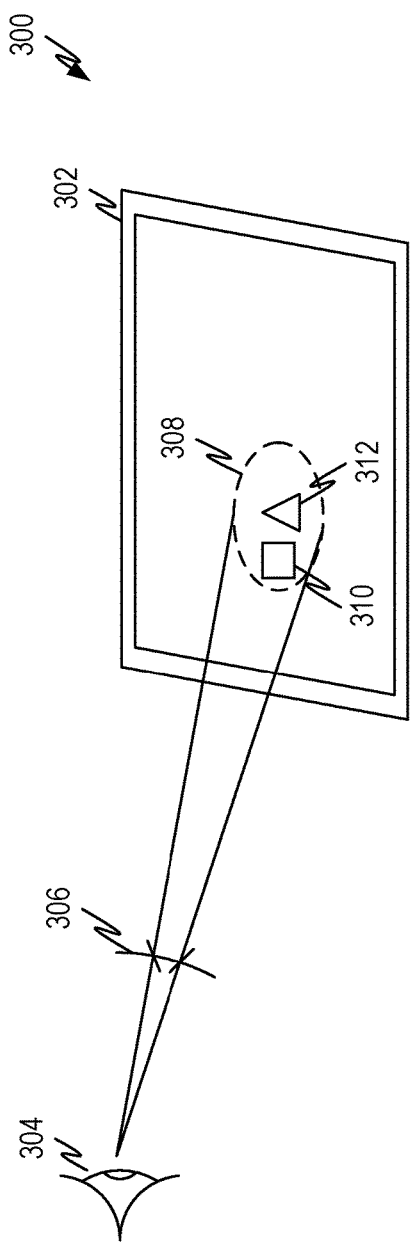
FIG. 3 illustrates example displays and the impact of angular error on item selection.

FIG. 3 illustrates example displays 300 and the impact of angular error on item selection. This illustrates the problem of the noisy eye gaze signal. For commercial grade eye gaze subsystems, the eye gaze signal can have a typical angular error of between 0.3 and 0.6 degrees in a well calibrated system and greater where the calibration is off in some fashion. Thus, from a user's eye 304, the angular error 306 resolves itself into an error area 308 on the screen. Assuming, for simplicity, that the error area 308 is circular (e.g., the user is looking perpendicular to the screen 302), this means that for a typical distance of a user's eye to a monitor between 24 and 30 inches away, the circular error area 308 is between about 0.13 inches and 0.31 inches.

The error area 308 sets a limit on how close displayed elements 310, 312 (screen elements) can be if the system is to differentiate between them. Thus, if displayed screen elements are optimized for gaze dwell detection (i.e., selection by staring at a screen element for some period of time), there is a limit on how close the elements can be placed together and still have reasonable detection probability. Some systems use different schemes to reduce the error area so that the system can differentiate between elements that are closer than the error. The present embodiments can incorporate any or all of these schemes to help with primary selection target detection (described below). However secondary selection target detection is performed in a different manner as outlined below.

Figure 4:
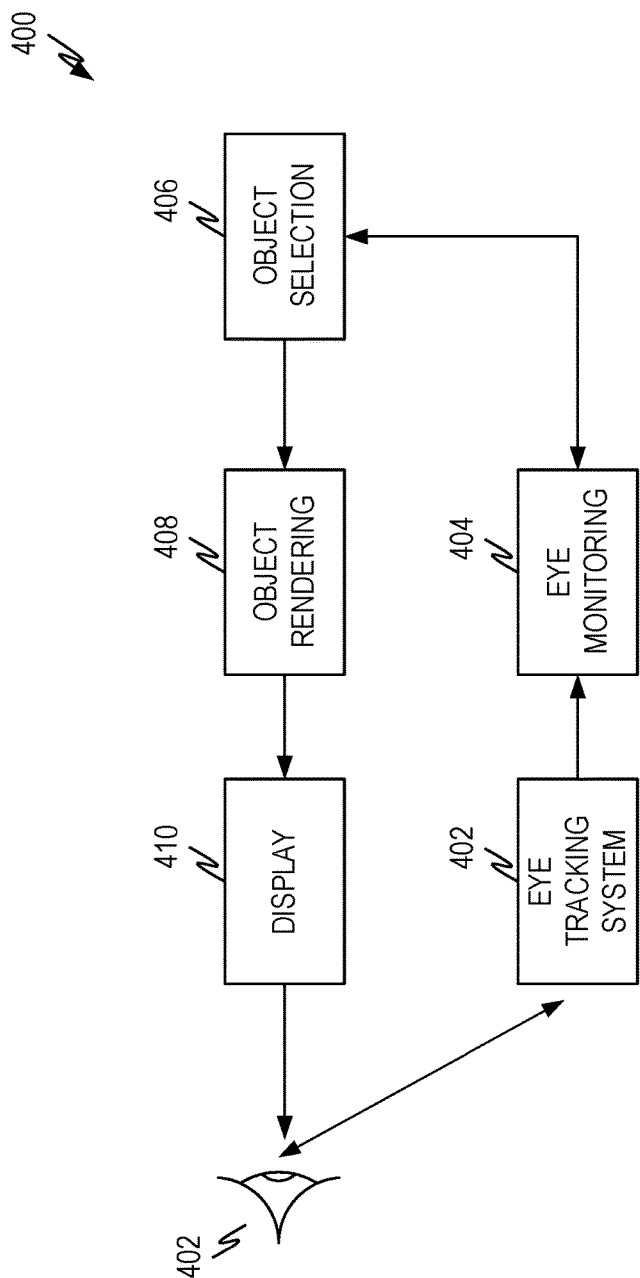
FIG. 4 illustrates an example architecture according to some aspects of the present disclosure.

FIG. 4 illustrates an example architecture 400 according to some aspects of the present disclosure. The architecture uses an eye tracking subsystem 402 to track the user's gaze as discussed above. The particular eye tracking subsystem 402 that is used is not important as long as the eye tracking system can produce a location vs. time signal (e.g., eye gaze signal) that is calibrated to display 410 so that the location where the user is looking on the display 410 can be determined.

The eye monitoring process 404 monitors the eye gaze signal and detects various events, such as the occurrence of an eye tracking vector that has an origin, a magnitude, and/or direction as discussed herein. There are several options for the eye monitoring process 404. In one embodiment, the eye monitoring process 404 creates an eye tracking vector and provides the eye tracking vector to the object selection process 406. In another embodiment, the eye monitoring process 404 receives a vector magnitude and direction from object selection process 406 and allows the object selection process 406 to set up a call back where the eye monitoring process 404 will tell the object selection process 406 if a vector meeting the criteria occurs or if the vector occurs within a designated time period. In another embodiment, the eye monitoring process 404 identifies a location to the object selection process 406 if the user gazes at one location for a designated dwell time. In yet a further embodiment, the eye monitoring process 404 allows the object selection process 406 to set up a callback where the eye monitoring process 404 will tell the object selection process 406 if a location meeting a dwell time occurs or occurs within a designated time period. Other possibilities can also be implemented by eye monitoring process 404.

Object selection process 406 receives eye tracking vectors, locations corresponding to designated dwell times, or call backs notifying the object selection process 406 of the occurrence of either. The objection selection process 406 can also set in motion animations of certain selection targets on the display 410 as described below.

Object rendering process 408 implements the desired rendering and/or animation from object selection process 406. Display 410 displays the selection targets and other items.

In operation, the display 410 shows one or more primary selection targets (explained below). The eye monitoring process 404 receives eye gaze signal from the eye tracking subsystem 402 and ascertains whether a location has met a gaze dwell criteria and/or whether an eye gaze vector meeting a criteria has been identified. Alternatively, the system can output location and/or vector information to the object selection process 406.

The object selection process 406 receives notification that a location and/or vector meets established criteria, such as by a callback from eye monitoring process 404. When the object selection process 406 identifies that location corresponding to a primary selection target has been selected by the user (e.g., through gaze dwell or some other manner), the object selection process 406 identifies one or more secondary selection targets and instructs them to be rendered and animated by object rendering process 408 on the display 410 as discussed below. The object selection process 406 also sets up a call back for eye tracking vector(s) with eye monitoring process 404 that correspond to the animation paths of the secondary selection targets as described below.

When the appropriate eye tracking vector occurs, object selection process 406 identifies which of the secondary selection targets has been selected by the user.

Figure 5:
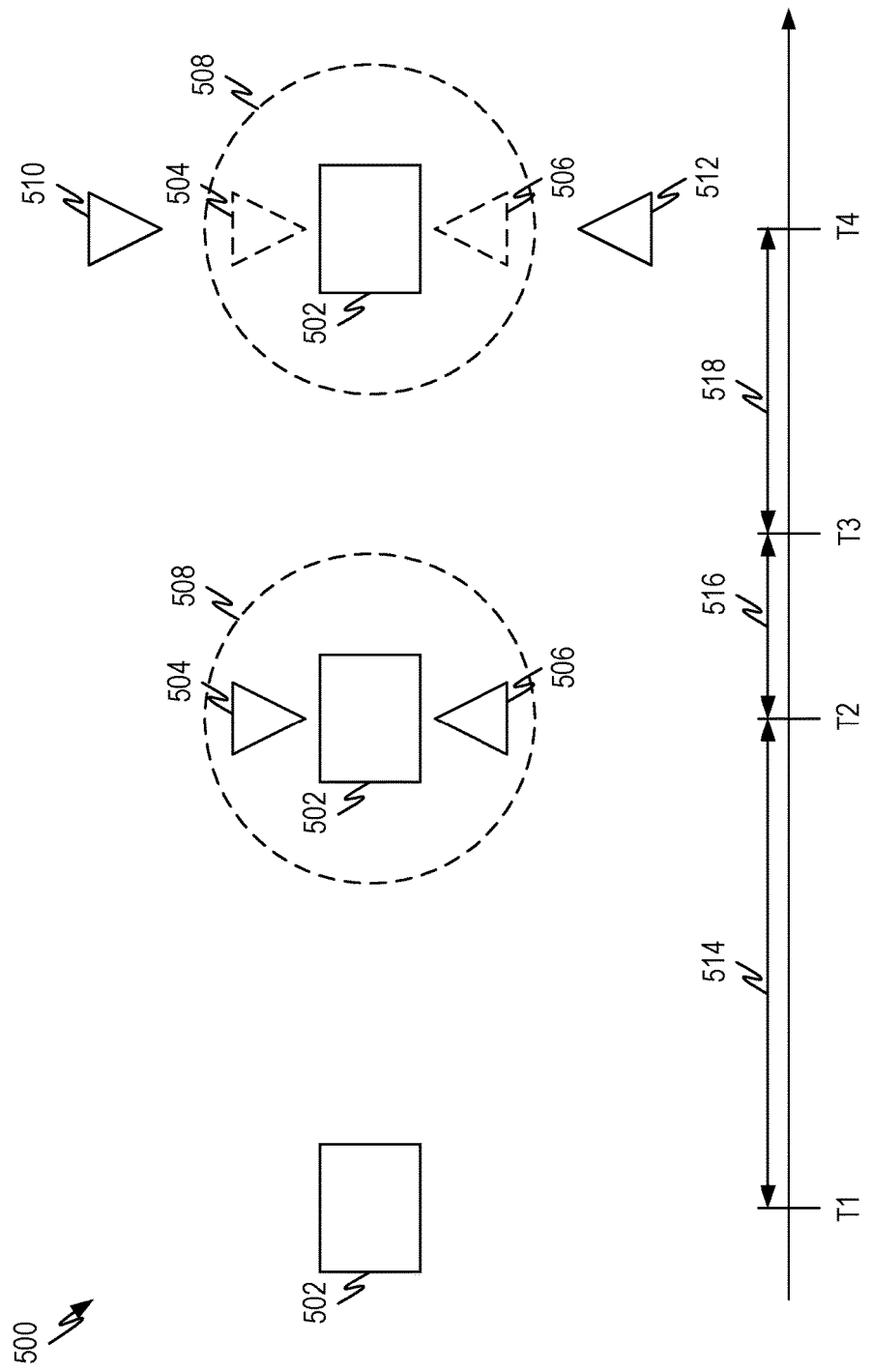
FIG. 5 illustrates a representative item selection animation according to some aspects of the present disclosure.

FIG. 5 illustrates a representative item selection animation 500 according to some aspects of the present disclosure. FIG. 5 is drawn as a timeline which shows what is rendered on the screen at particular times (e.g., T1, T2, T3, T4, and so forth). The animation 500 shows the basic animation for selection of an initial or primary selection target and a secondary selection target. In this diagram, general symbols (i.e., squares and triangles) are used to illustrate selection targets. However, as noted above, selection targets can be words, symbols, icons, user interface elements, and so forth. Selection targets can be any type of object or item that can be selected by a user in a context.

At time T1 primary selection target 502 is rendered. In the context of this disclosure rendering simply means to display and can be accomplished in the manner prescribed by the system and/or display on which the methods described herein are executing. The initial rendering of the primary selection target 502 can comprise an animation if desired. The primary selection target is the target that a user selects to begin the selection process of a secondary selection target. A primary selection target is a target around which secondary selection targets (described below) can be rendered. Secondary selection targets are selection targets rendered around a primary selection target.

The user selects the primary selection target 502 through a selection mechanism, such as through gaze selection (e.g., focusing on the primary selection target 502 for a particular dwell time), gesture selection, mouse selection or any other method that indicates selection of the primary selection target 502. Time delay 514 represents the time from initial rendering of the primary selection target 502 to rendering of the secondary selection targets 504, 506 (discussed below). Time delay 514 includes the gaze dwell time if the user selects the primary selection target 502 by gaze dwell time.

After the primary selection target 502 has been selected by the user, the system renders one or more secondary selection targets 504, 506 in proximity to the primary selection target 502. The proximity region is illustrated by circular area 508 in FIG. 5. Experimental results from prototype systems of the presently disclosed embodiments, show that the system works better if the secondary selection targets 504, 506 are rendered close to the primary selection target 502 but not so close as to be indistinguishable by the user. In one embodiment, the secondary selection targets 504, 506 are rendered to be likely to fall within the foveal view area of the user. The foveal view area of the user is considered to be within two degrees of the focus of the user (e.g., where the user is focusing). In other embodiments, the secondary selection targets 504, 506 are rendered to be likely to fall within the central view of user. The central view of the user is considered to be within five degrees of the focus of the user. In yet another embodiment, the secondary selection targets 504, 506 are rendered to be likely to fall within the paracentral view of the user. The paracentral view of the user is considered to be within eight degrees of the focus of the user.

As the foveal, central and paracentral view of the user are defined by angular measurements for a user's focus, the absolute distance between the primary selection target 502 and the secondary selection targets 504, 506 are dependent upon the distance of the screen from the user's eye. Thus, for simplicity, assumptions can be made about how far a particular device is held by a user on average and use a distance measure between the primary selection target 502 and the secondary selection targets 504, 506. For example, a phone or tablet may be held, on average, between about 15 and 17 inches from a user's eye. For a device held at 15 inches from a user's eye, a two degree foveal region translates into about a 0.5 inch area. Thus, keeping secondary selection targets within a half-inch area around the primary selection target will keep the secondary selection targets within the user's foveal view area. However, as noted, as long as the secondary selection targets can be distinguished, closer can be more beneficial. In some instances, depending on what the primary selection target and secondary selection targets look like, it may be possible for a user to distinguish between the secondary selection targets even when the secondary selection targets and the primary selection target completely or partially overlap (e.g., the secondary selection targets are rendered on top of at least a portion of the primary selection target).

When distances are used, different embodiments can use different distance measurements. For example, in one embodiment the secondary selection targets are rendered so that they fall at least partially within a region (e.g., circular region) with a given distance measure (e.g., radius) from the center of the primary selection target. In another embodiment, the distance measure is the distance between the edge of the primary selection target closest to the secondary selection target and the edge of the secondary selection target closest to the primary selection target (e.g., the space between the primary selection target and the secondary target). In yet another embodiment, distances between the center of the primary selection target and the center of the secondary selection target can be used. Other distance measures can also be used. Within any given distance measure, the range of acceptable values can be determined by setting the minimum distance and the maximum distance based on a selection process. For example, when setting the minimum and maximum distance based the angular measurements of the foveal, central or paracentral regions described above, the distances can be calculated assuming average distances of devices to a user's eye as shown above. Additionally, or alternatively, the minimum and maximum distances can be set by what a user experiences and/or using a calibration process in the system. For example, the minimum distance can be set to the distance where an average user can still distinguish between the secondary selection targets and the maximum distance can be set to the distance where the secondary selection targets fall outside an average user's focus area (e.g., where a user cannot hold both the primary selection target and the secondary selection target in their focus without shifting their eyes).

Returning to FIG. 5, the secondary selection targets 504, 506 are rendered at time T2. The system can have a short delay 516 before beginning any animation of the secondary selection targets in some embodiments. Thus, at time T3, the system begins animation of the secondary selection targets 504, 506 to move them from their initial locations to new locations, as indicated by 510 and 512. The animation can be spread over a particular time frame 518, so that the animation begins at a given time T3 and ends at a given time T4.

The animation used can be any animation that moves the secondary selection targets from their initial locations to new locations. In one embodiment, continuous movement (e.g., using an acceleration/deceleration profile) is used to transition the secondary selection targets from their initial locations to their new locations. In another embodiment, a fade out/fade in animation is used so that the secondary selection targets fade out from their initial locations and then fade in at their new locations. Depending on the length of time for the fade out and fade in animations and the length of time period 518, the secondary selection targets may be completely absent from the display during some portion of time period 518 or may exist at both the initial locations and secondary locations during some portion of time period 518. In yet another embodiment, the secondary selection targets can disappear from their old locations and reappear at their new locations so that they appear to jump from one location to another. This last option is the same as a fade out and/or fade in animation with a very short or zero duration during the fade out and/or fade in portion of the animation.

The animation as described in FIG. 5 causes behavior in the user's eye that instinctively causes the user to follow the secondary selection they desire and thus provide an eye movement vector having a starting origin, a magnitude and a direction. For example, consider a system where the primary selection target 502 comprises a "send" action (i.e., text, icon, symbol, etc. that causes a send action to happen). By focusing on the primary selection target 502, the system interprets the gaze dwell as a user intent to invoke the send action. The secondary selection targets 504 and 506 can be confirmation actions such as an "ok" action for 504 and a "cancel" action for 506.

In response to gaze dwell on the "send" target 502, the system renders the "ok" target 504 and the "cancel" target 506, and animates them so that they initially appear in close proximity to the "send" target 502 and then move outward to their final locations 510 and 512, respectively. If the user actually intended to invoke the send action, their gaze will naturally track the "ok" target from location 504 to location 510 and produce a vector proportional to the distance between location 504 and location 510 and a direction of "up". If the user actually did not want to invoke the send action, their gaze will naturally track the "cancel" target from location 506 to location 512 and produce a vector proportional to the distance between location 506 and location 512 and a direction of "down".

Thus, as one example, the initial rendering target can invoke a function with secondary targets acting as confirmation of invoking the function. Other uses are to enter multiple items, such as a string of characters, letters, numbers, words, and so forth as described herein.

In the discussion above, the secondary selection targets do not appear until the primary selection target is activated (i.e., selected). However, the system works just as well when the secondary selection targets are rendered along with the primary selection target instead of waiting until the primary selection target is selected to render the secondary selection targets.

Figure 6:
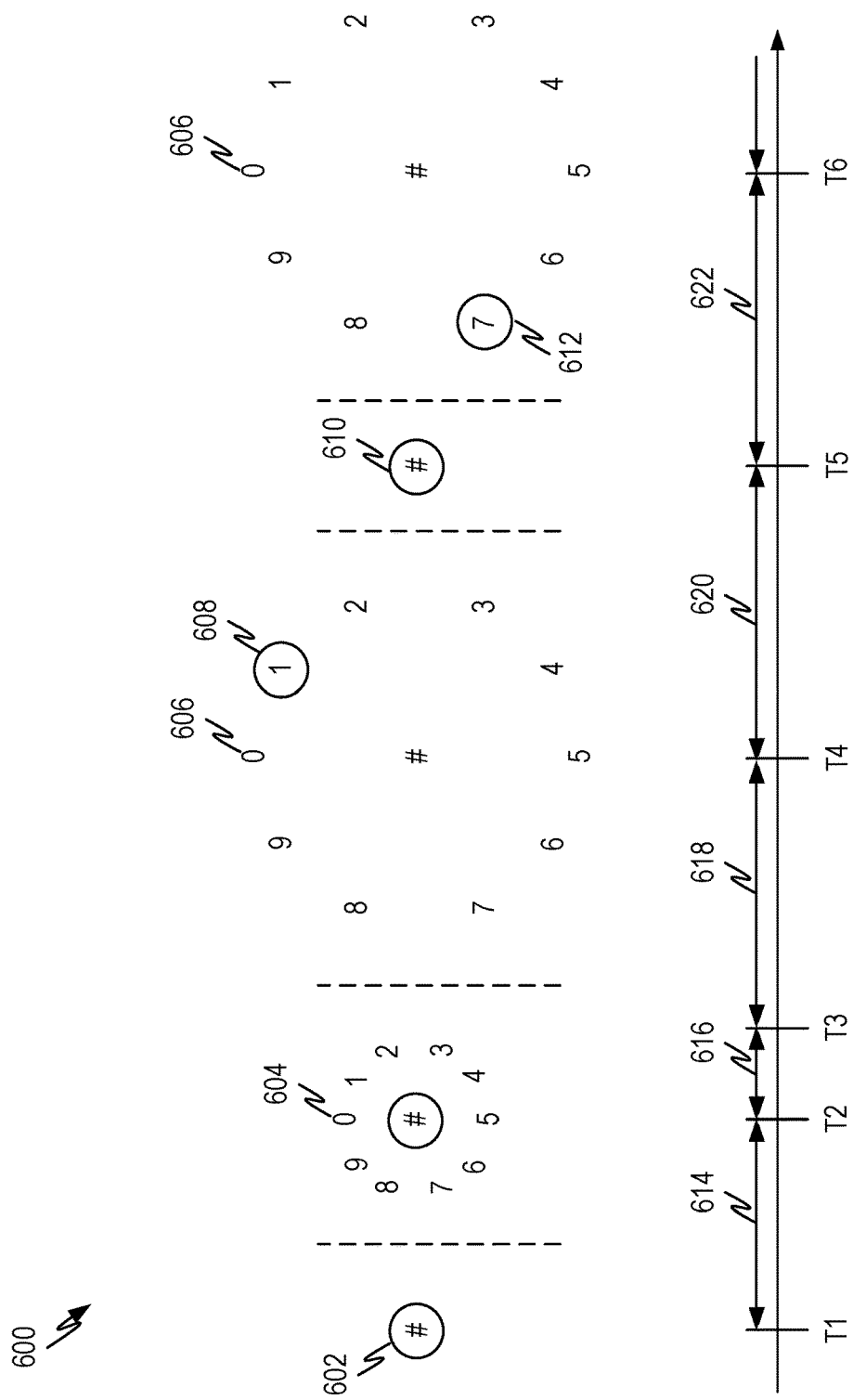
FIG. 6 illustrates another representative item selection animation according to some aspects of the current disclosure.

FIG. 6 illustrates another representative item selection animation 600 according to some aspects of the current disclosure. FIG. 6 shows a representative example of how multi-item selection might be when entering a string of numbers. In FIG. 6, the vertical dashed lines represent changes in what a user sees and are there to simply help the reader to clarify when something changes on the screen.

The primary selection target 602 is rendered on the screen. In this example, the primary selection target is a symbol indicating the user can enter numbers (sort of like a keypad) and is represented in FIG. 6 by the '#' symbol. At time T1 the primary selection target is selected, such as by gaze dwell, although another selection mechanism can be used. The circle around primary selection target, and secondary selection targets represent where a user's focus is in the example.

At time T2, the secondary selection targets are rendered. In this example, the secondary selection targets are the numbers 0 through 9 and are arranged radially around the primary selection target as shown in 604. As noted above, the secondary selection targets are rendered close to the primary selection target in a way that they can be in the user's view, but still distinguishable from each other.

After an optional delay (e.g., 616) the system animates the secondary selection targets and moves them radially away from the primary selection target. As noted above, a fade out/fade in animation or other animation can be used. Assuming the optional delay 616, the animation begins at time T3 and ends at time T4 for a total duration of 618. This results in the screen picture of 606.

Assuming the user wanted to enter '1' as the first number, the user's gaze would naturally go to the '1' as shown by the circle 608. This creates an eye tracking vector going roughly from the primary selection target of '#' to the secondary selection target of '1' in roughly the same direction as the '1' moved during the animation sequence. Errors and detectability of eye tracking vectors are discussed below.

Assuming the example of FIG. 6 uses the fade out/fade in animation, several benefits can be achieved. The fade out/fade in animation tends to create a situation where the user's eye jumps from the primary selection target of '#' to the secondary selection target of '1'. Such a jump has been found to be more detectable than 'chase' vector produced when a continuous animation is used (e.g., the '1' is animated continuously along a track from its initial position shown in 604 to its final position shown in 606). Also the jump behavior tends to be the way a user's eye wants to move and is generally less tiring on the user than a slow moving 'chase' eye movement that is created by a continuous animation.

The eye tracking vector from the '#' character to the '1' character is detected by the system and a '1' is identified as the user input. At this point, for multi-character entry, the system can remove the secondary selection targets (0 . . . 9) and leave the primary selection target of '#' on the screen. If the user desires to enter additional characters, the user can again move back to the primary selection target '#'. This reengagement with the primary selection target '#' can be measured by an eye tracking vector (e.g., from the '1' to the '#') or by allowing the user to reengage such as through gaze dwell.

Once the primary selection target '#' is selected by the user as shown by circle 610, the system can re-render the secondary selection targets. This can be achieved by re-rendering them at their initial locations (e.g., as shown in 604) and the original animation sequence can be repeated. In the alternative, the secondary selection targets can simply be re-rendering at their final locations (e.g., as shown in 606) at time T6. Testing has shown that if the secondary selection targets are re-rendered at their final locations 606 (e.g., using a fade in animation), then the user's gaze will jump from the primary selection target '#' to the desired number (e.g., '7' as shown by 612 at time T6). This produces an appropriate eye tracking vector that can be detected and decoded to identify the user's desired selection (e.g., '7' as shown by 612 at time T6).

When the user does not wish to enter further numbers, the user refrains from reengaging with the primary selection target '#'.

FIGS. 7-10 represent one way that the principles of the present disclosure can be applied to a representative gaze selection keyboard. The figures describe animation sequences and that help make it easy for the user to type using gaze selection.

Figure 7:
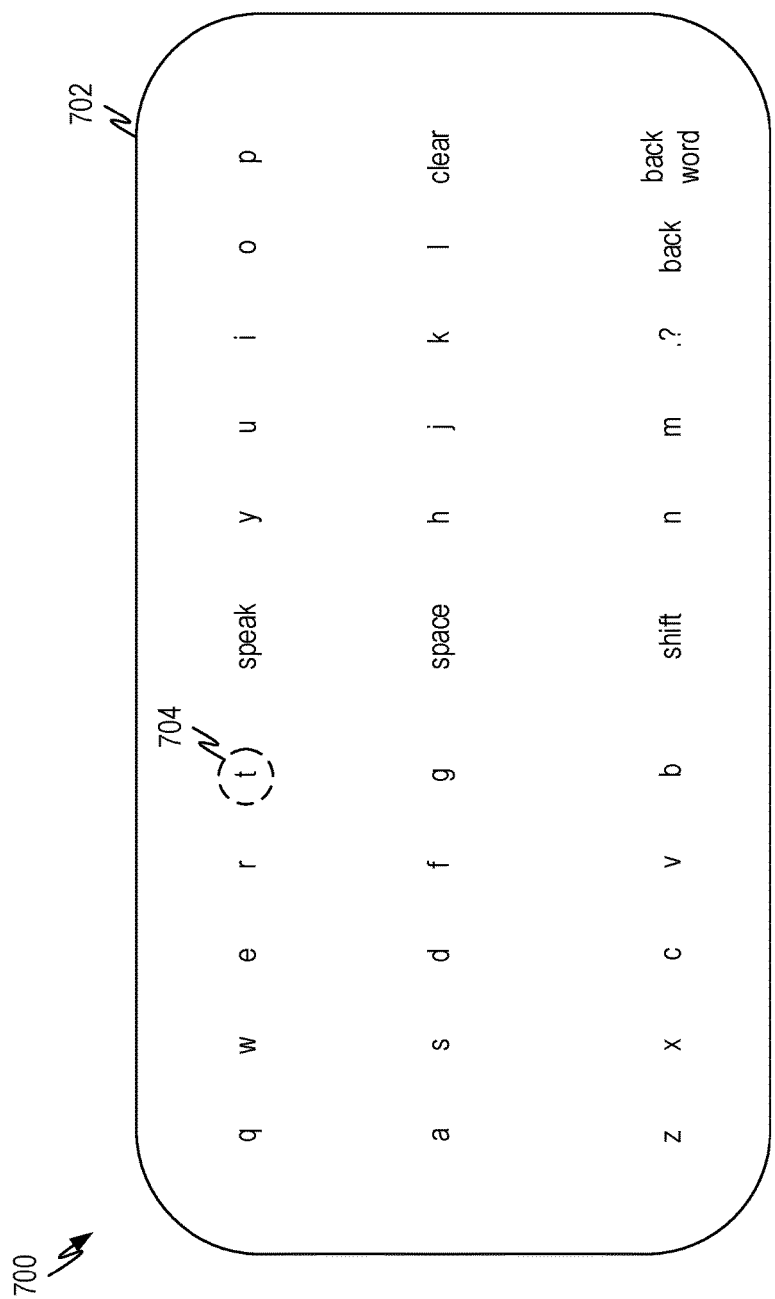
FIG. 7 illustrates a representative gaze selection keyboard according to some aspects of the current disclosure.

FIG. 7 illustrates an initial representation of a gaze selection keyboard 700. The initial representation can have a keyboard delineation boundary 702 if desired for visual separation, although such is not required. In the representative example, the individual "keys" containing letters and/or other commands are separated by a sufficient distance that gaze dwell can be used for the user to select a desired key. Visual boundaries can be placed around the keys if desired, although such are not shown in FIG. 7. As shown in the example of FIG. 7 no secondary selection targets are initially rendered (i.e., prior to a user selecting the first key) although in some embodiments one or more secondary selection targets can be initially rendered along with the letters and commands that make up the keys.

As noted above, primary selection targets are selection targets around which secondary selection targets can be rendered. In the examples of FIGS. 5 and 6 only a single primary selection target was illustrated. However, in the keyboard of FIG. 7, the keys (e.g., letters and commands) shown are all primary selection targets.

Once the user selects an initial primary selection target (key), the system will render secondary selection targets that are associated with that key being chosen as the initial primary selection target. For example, suppose the user initially selects the 't' key as illustrated by 704. When the key is selected, secondary selection targets associated with the 't' as the initial primary selection target (e.g., context where T is initially selected by the user) secondary selection targets chosen with 't' as the initially selected key will be rendered.

One way to identify secondary selection targets is to use prediction logic to identify what the user is likely to type next. Keyboard prediction logic, both in the form of word prediction and 'type ahead' prediction is known in the art and any such logic can be used to identify a series of secondary selection targets for the user to consider.

Figure 8:
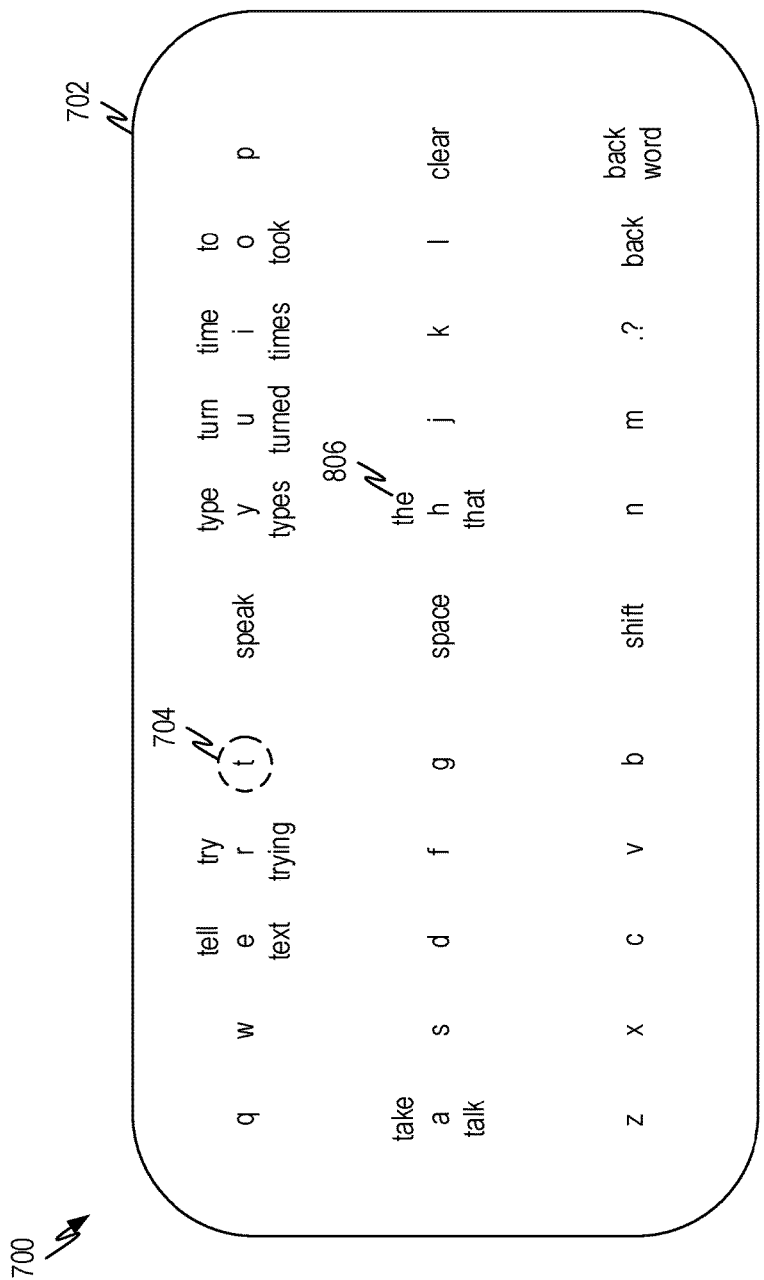
FIG. 8 illustrates a representative gaze selection keyboard animation according to some aspects of the current disclosure.

Turning now to FIG. 8, secondary selection targets in the form of predictive words are rendered around primary selection targets (e.g., keys) based on the user selecting T as the initial primary selection target. For example, around the e' is "tell" and "text" and around the 'h' is "the" and "that".

Placing the predictive words acting as secondary selection targets around the keys allows the user to quickly select a word as the desired word. This is because user need not look at all the predictive words to see if the one the user wants is there and then select that word, such as would occur if the predictive words where provided in a list or location separated from the keys.

Thus, if the user wants to enter "the," the user's eye would naturally flow from the 't' to the 'h' since the user is spelling the word out. When the user's eye tracks from the 't' as shown by 704 to the 'h' as shown by 806 the user's eye would naturally track to the secondary selection target of "the" as discussed below. If the user wanted to enter a different word, the user's eye would track from the 't' to a different letter.

Figure 9:
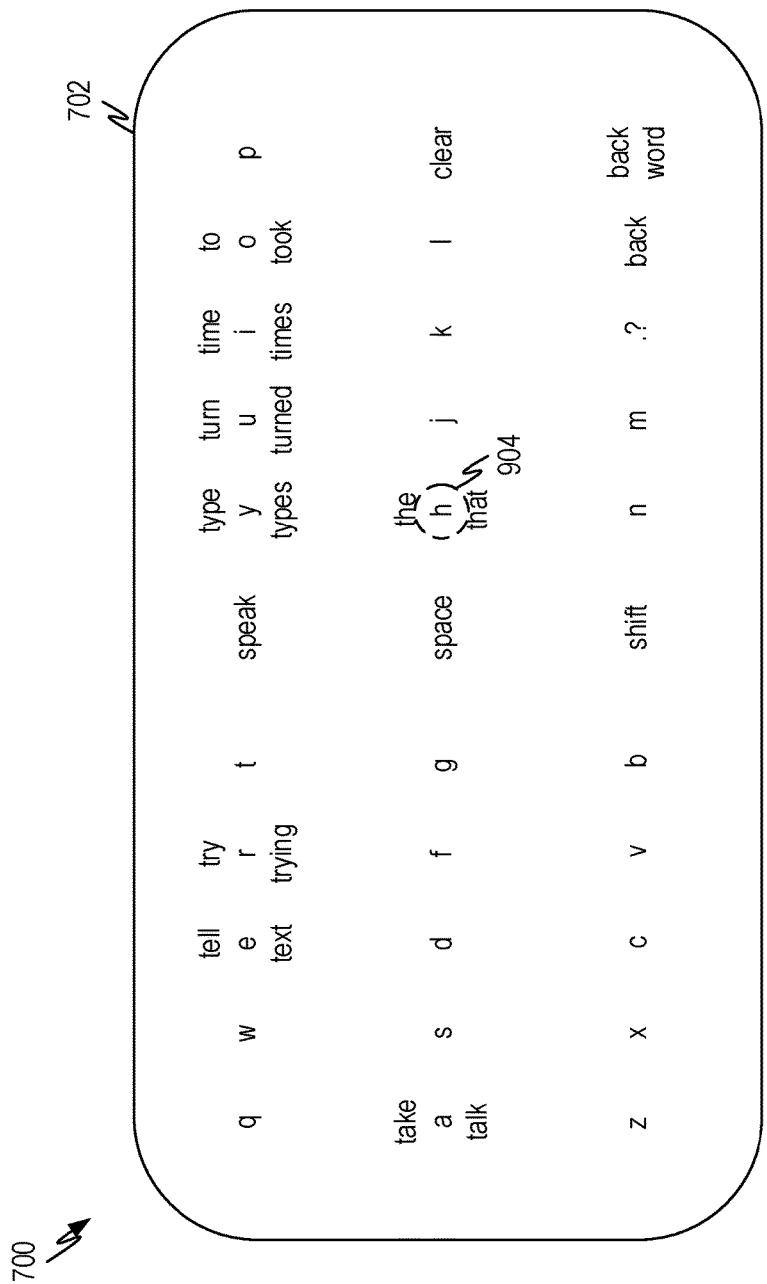
FIG. 9 illustrates a representative gaze selection keyboard animation according to some aspects of the current disclosure.

Turning next to FIG. 9, if the user intended to enter "the," the user's eye tracks to the 'h' character as indicated by 904 and the 'h' can be entered as the next letter. As the user's eye tracks to the 'h', the secondary selection targets "the" and "that," which were rendered in response to the user first entering the T as the initial primary selection target, fall within the user's gaze and the user will recognize them if one is the intended word.

Figure 10:
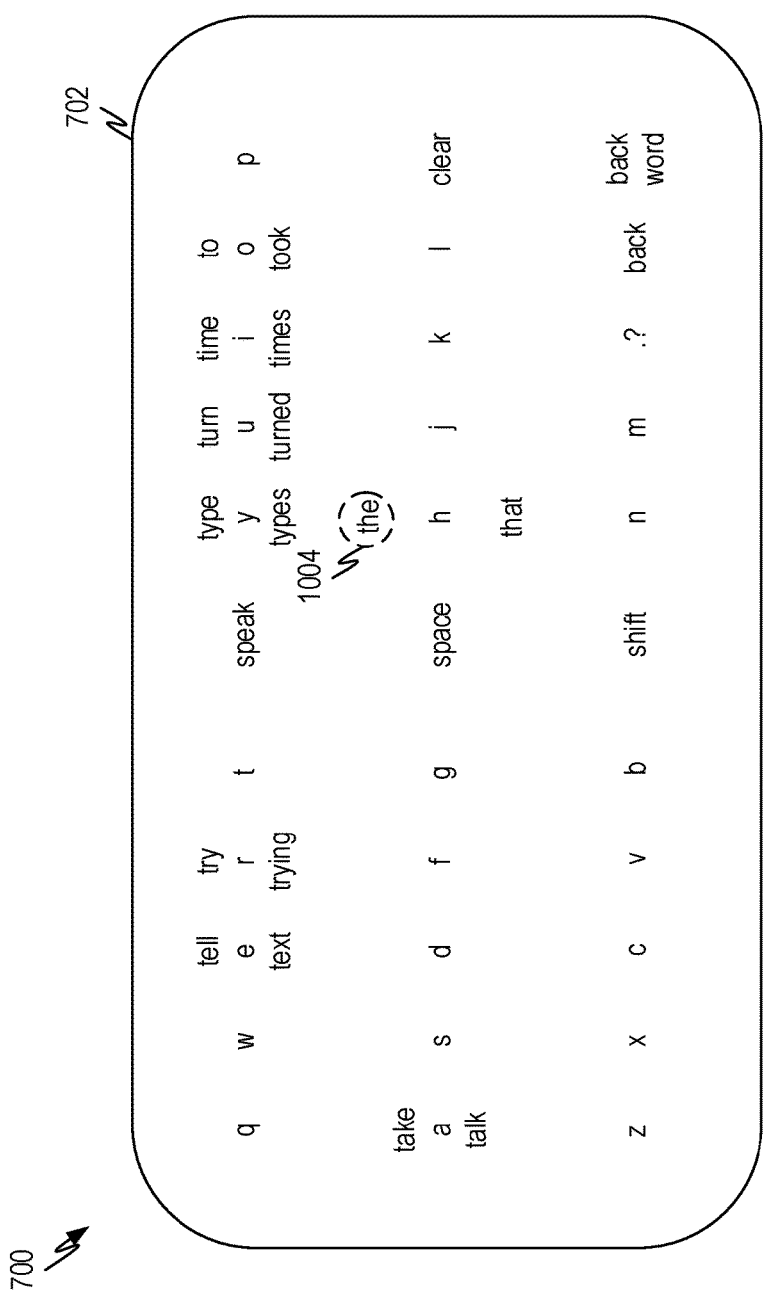
FIG. 10 illustrates a representative gaze selection keyboard animation according to some aspects of the current disclosure.

As the user's gaze tracks to the 'h' character, if the user intends to enter "the" the user will instinctively linger a bit longer on the 'h' and, in response, the system can begin animation of the secondary selection targets "the" and "that" as shown in FIG. 10. The animations can be as previously described. Assuming the user intended to enter "the" the user's eye will go to "the" and create an eye tracking vector that allows the system to identify "the" as the user's selection, as described herein.

Returning for a moment to FIG. 9, if once the user's gaze tracks to 'h' the user does not see the desired word, the user will naturally move onto the next letter. Thus, if the user intended to enter "thyme" the user would move from the 'h' to the 'y' and the system can use the predicative word logic to identify words that begin with 'th' and render them as secondary selection targets around their the appropriate primary selection target. Thus, 'thyme' can be rendered around the 'y' key, "thin" and "thins" can be rendered around the T key, and so forth.

The above illustrates a principle that embodiments of the present disclosure can have multiple primary selection targets (e.g., the keys of the keyboards). The secondary selection targets that are rendered around a primary selection target can depend upon selection of one or more primary selection targets. In the above keyboard example, in response to the user selecting T secondary selection targets were rendered around other primary selection targets but not the 't' selection target. When the user selected the 'h' key, the user could indicate selection of the e' key (e.g., by focusing on the e' for a dwell time) and the system would animate the secondary selection targets of "tell" and "text." If the user continued selecting keys, such as moving to the 'n' key, the system could change any secondary selection targets around the 'n' key, such as rendering "tent" and "tenant." Thus, the rendering of "tell" and "text" were dependent upon selecting the T while "tent" and "tenant" were dependent upon selecting the sequence of primary selection targets 't' 'e'. In addition, multiple primary selection targets can be selected prior to, or after, rendering of the secondary selection targets.

The word prediction technology described in conjunction with keyboard 702 can be further extended to sequences of words. For example, suppose the user enters "the" as described above by first focusing on the 't,' moving focus to the 'h' and selecting "the" when the secondary selection targets are animated. In response to the user entering "the," the prediction technology may identify a list of words that are likely to be entered next. For example, suppose the list comprises a plurality of words including the list below:

area
ability
amazing
best
back
company
country
complex
day
dollar
dark
depot
end
entire
...

Assuming that each key (primary selection target) can have n words (secondary selection targets) based on the screen layout (e.g., two words—one above and one below each key), the system can select the top n words for each letter and render them around the appropriate keys as secondary selection targets, replacing any existing secondary selection targets, right after "the" is entered by the user. The user could then begin to enter the first letter of the next word and if the desired word is a secondary selection target, enter the word as previously described. Thus, in this further example, embodiments of the present disclosure can have secondary selection targets that are also based on a previously entered secondary selection target. For example, "the" is the first entered secondary selection target and "area" and "ability" from the list above can be rendered around the 'a' key in response to entry of "the."

In general, a system can have one or more primary selection targets, one or more secondary selection targets that are rendered around a primary selection target. The secondary selection targets can be rendered based on prior selection of one or more primary selection targets, of one or more secondary selection targets, and/or of a combination of primary and secondary selection targets. The secondary selection targets can be animated (e.g., using a selected animalization) so that the move from an initial location to a new location in response to an event, such as selection of an associated primary selection target. After selection of an initial secondary selection target, subsequent secondary selection targets can be rendered in a pre-animated state (e.g., the initial location around a primary selection target) such as in the keyboard example or a post-animated state (e.g., the new location around a primary selection target) such as in the FIG. 6 example.

Figure 11:
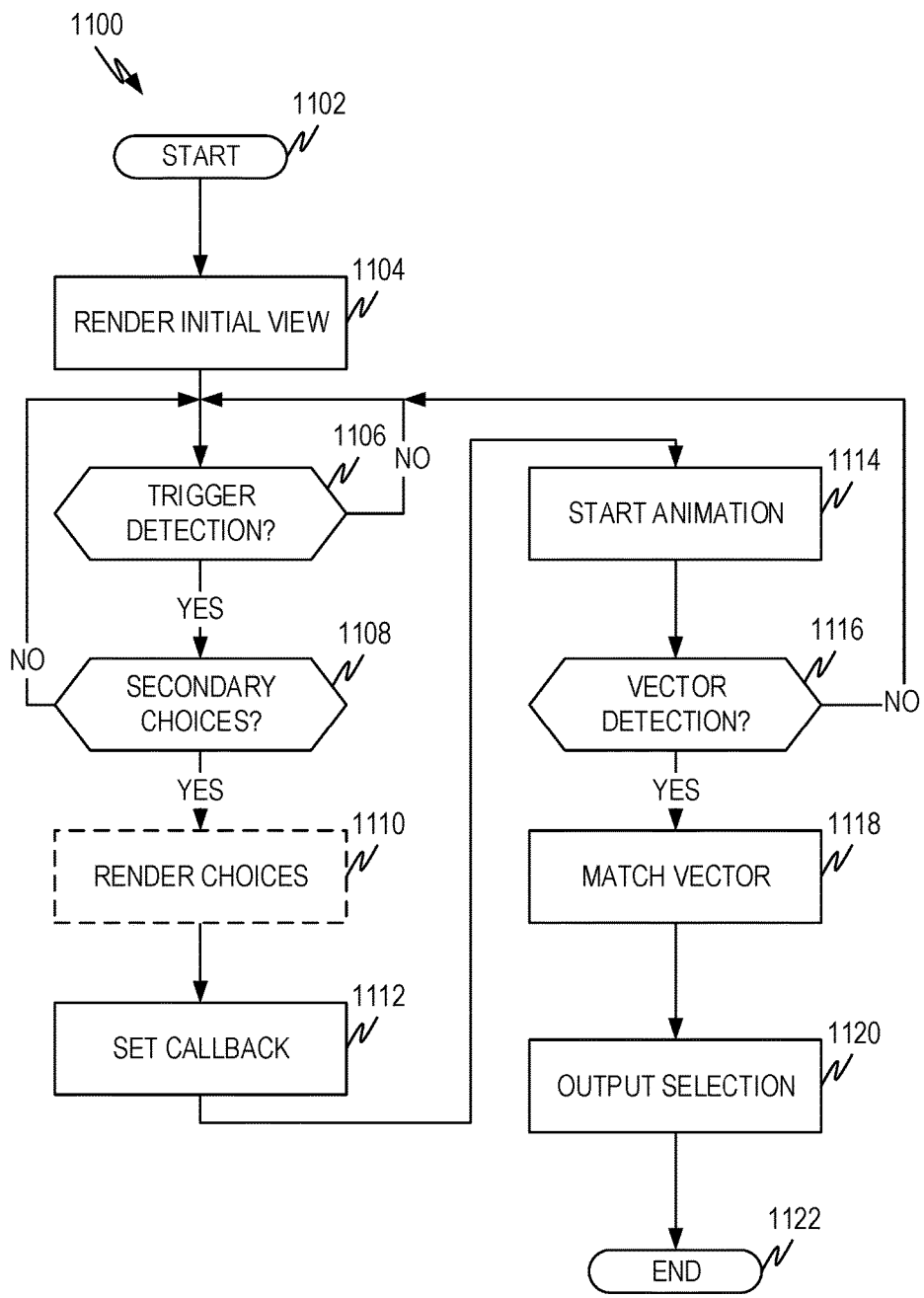
FIG. 11 illustrates a flow diagram for item selection using eye gaze according to some aspects of the current disclosure.

FIG. 11 illustrates a flow diagram 1100 for item selection using eye gaze according to some aspects of the current disclosure. The system renders an initial view in operation 1104, which comprises one or more primary selection targets and (optionally) one or more secondary selection targets. Execution proceeds to operation 1106 where the user waits for user selection of one of the primary selection targets. As discussed above, selection of a primary selection target can comprise selection by eye gaze dwell (e.g., focusing on a primary target for a period of time called the dwell time), or in some other fashion such as by mouse click, voice selection, gesture, or any other mechanism.

Once the system has detected selection of a primary selection target, the "yes" branch of operation 1106 is taken to operation 1108 where the system determines whether secondary selection targets are available at the selected primary selection target. As discussed herein, secondary selection targets can be associated with a primary selection target and rendered either prior to or after selection. If so, the "yes" branch is taken out of operation 1108.

In some instances, there are no secondary selection targets available at a primary selection target. Also, as seen in the discussion of FIGS. 7-10 whether secondary selection targets are available at a given primary selection target can be based on past selection of primary selection target(s). Thus, when the user selected the 't' secondary selection targets became available at other primary selection targets ('e', 'h', and so forth), but not at the T. Thus, in such a situation there would be no secondary selection targets and the "no" branch would be taken out of operation 1108 to await selection of a primary selection target that had secondary selection targets available. Additionally, although not shown on the flow diagram of FIG. 11, action(s) associated with the selected primary selection point can be initiated. For example, when the T was selected in FIG. 7, the secondary selection targets were rendered around other keys as shown in FIG. 8. Thus, the "no" branch out of operation 1108 can also be associated with performing one or more operations.

Once secondary targets are available for the selected primary selection target, the "yes" branch leads to operation 1110, where secondary selection targets are rendered, if they haven't already been rendered.

Execution proceeds to operation 1112 where a callback is set. As described above, one possible implementation is for the system to set one or more callback requests with a process that monitors the eye tracking signal. The eye tracking process can accept as an input to the callback an eye tracking vector having a magnitude and a direction. Additionally, or alternatively, the callback input can also include a time frame that the callback is to be active (e.g., the system is notified only if a vector matching the input occurs within a designated time period). Alternatively, the system can cancel callbacks when they are no longer relevant. In yet a further alternative implementation, multiple vectors can be passed as part of the callback request and the occurrence of any vectors will trigger a callback.

In operation 1114, the system starts the animation of the relevant secondary selection targets. Relevant secondary selection targets are those associated with a selected primary selection target, such as described herein. Animation occurs as described above so that the secondary selection target(s) move from a location proximate the primary selection target to a location more distant from the primary selection target.

Execution proceeds to operation 1116, where the system identifies whether an eye tracking vector occurred that matches one of the secondary selection targets. This can be waiting for a set callback for a set period of time after the animation has finished. For embodiments where eye tracking vectors are provided (e.g., not in the context of a callback), the system can match the vectors. Matching of vectors, either by the eye tracking monitoring process (e.g., 404) or by the object selection process (e.g., 406), or by some other process is discussed in greater detail in conjunction with FIG. 12 below.

If no callback is received within the relevant time period (i.e., indicating no vector matching the animation trajectory of a secondary selection target is identified), the "no" branch from operation 1116 leads back to operation 1106, where the system awaits detection of a primary selection target.

If a callback is received (i.e., indicating a vector matching the animation trajectory of a secondary selection target is identified), the secondary selection target matching the trajectory of the vector is identified as a selected secondary target in operation 1118.

Operation 1120 outputs the identified secondary target and the system can take appropriate action based on which secondary target was selected.

The process ends at operation 1112.

As described herein, rather than use a callback system, the eye tracking process can monitor the user's eye track signal and output vectors representing the user's eye motion and the process of 1100 can monitor the eye tracking vectors to determine when one matches a secondary selection target. Those of skill in the art can ascertain how to modify the flow diagram of FIG. 11 to implement such an embodiment from the disclosure of this application.

Figure 12:
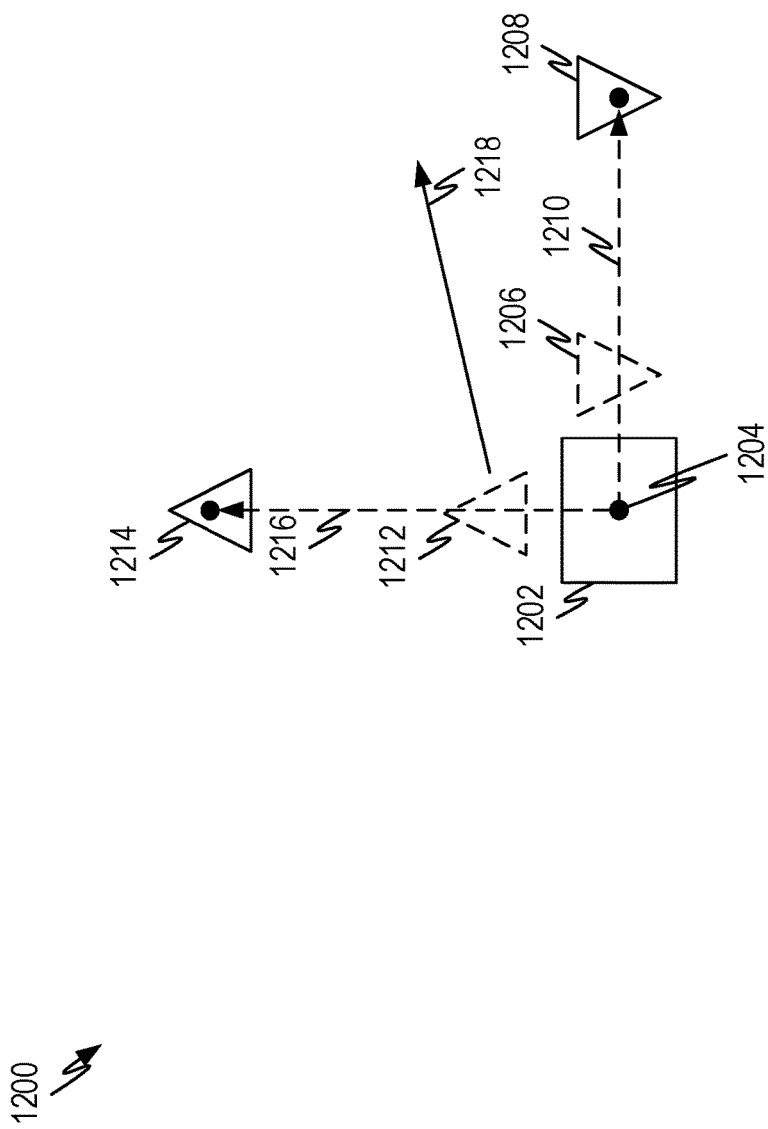
FIG. 12 illustrates a diagram showing a representative eye tracking vector according to some aspects of the current disclosure.

FIG. 12 illustrates a diagram showing a representative eye tracking vector 1200 according to some aspects of the current disclosure. This diagram illustrates the impact that noise has on eye tracking vectors and shows the tolerance the present approach has on item selection by eye tracking.

A primary selection target 1202 is rendered along with two secondary selection targets at locations 1206 and 1212. The two secondary target locations are shown at right angles to each other for purposes of illustration. Distributing the number of secondary selection targets around a primary target so they have the maximum angular distance between them minimizes the error probability in the presence of a noisy signal for reasons that will quickly become clear. Thus, a more practical implementation when there are only two secondary selection targets is to distribute them at 180 degrees from each other.

In accordance with the principles of the disclosure, the two secondary selection targets are animated so they move from their initial locations at 1206 and 1212 to new locations 1208 and 1214, respectively. As discussed any animation that causes the secondary selection targets to move from their initial locations to the new locations can be used. As discussed above, one animation that works well is to fade the secondary selection target out at the initial location and fade the secondary selection target back in at the new location.

Assuming that there is no error or noise in the system, the motion would produce an eye tracking vector that went from the center 1204 of the primary selection target 1202 to the center of the secondary selection targets at the new locations 1208 and 1214. These vectors are indicated by 1210 and 1216.

In reality, there is errors in the eye tracking vector. For example, there can be an error in the origin of the vector and in the end point of the vector. Additionally, if the animation is such that the user's eye attempts to slowly follow (e.g., slow pursuit) a moving secondary selection target, the vector may not be straight as there will be errors at each measured point along the vector. Thus, the type of animation used can also influence what errors exist in the eye tracking vector. On the other hand, the fade out/fade in animation tends to have less noise along the length of the vector and have errors in the starting location and ending location as illustrated below.

In FIG. 12, vector 1218 represents a typical vector that is received from the eye tracking process. The vector has errors in both the starting and ending points, which is reflected in an error of the origin of the vector, in the angle of the vector and in the magnitude of the vector. However, to identify which of the secondary selection targets are intended by the user, the origin need not be used. The intended secondary selection target can be determined from only the magnitude and angle. A representative process is illustrated in FIG. 13.

However, the principle is to use the magnitude to determine if selection of a secondary target is intended and the angle used to determine which secondary selection target is intended. Thus, the secondary target with the closest angle can be selected as the selected secondary target. In the illustrated diagram, the selected secondary target would be the secondary selection target that moves from location 1206 to location 1208.

Figure 13:
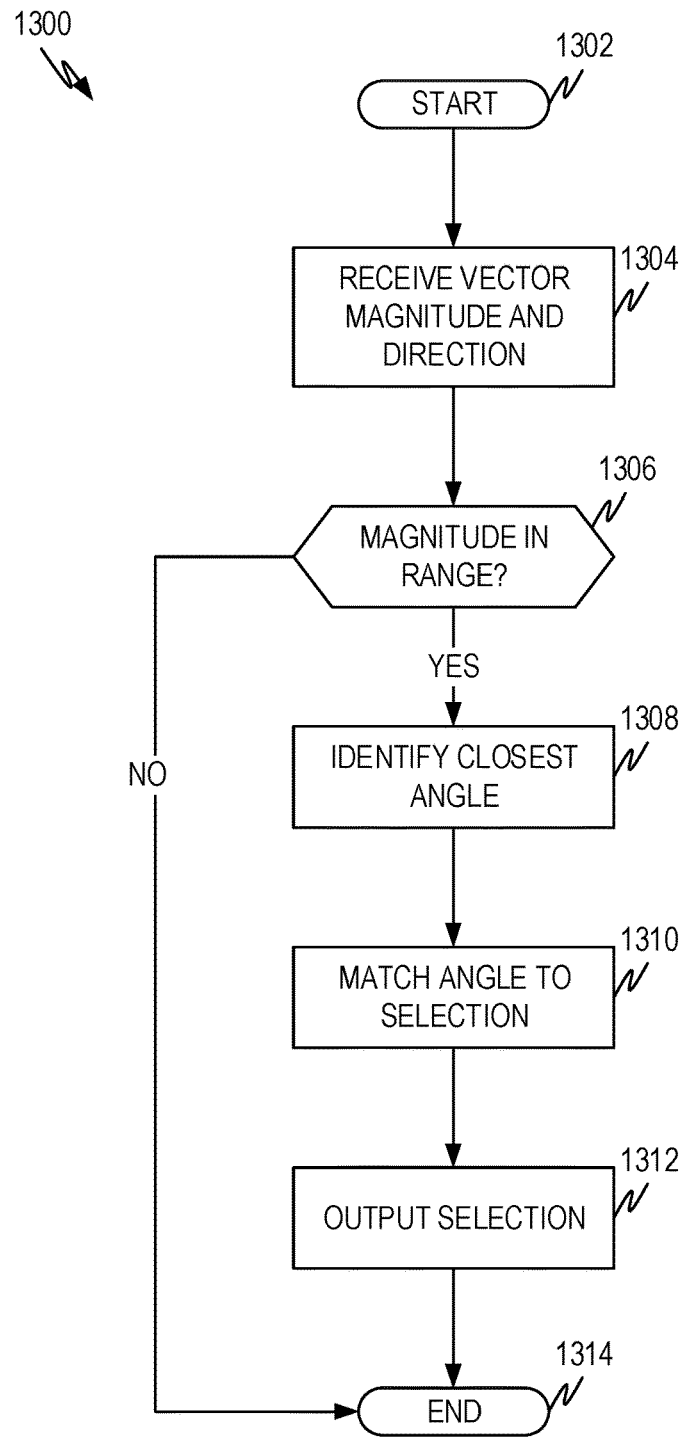
FIG. 13 illustrates a flow diagram for matching an eye tracking vector to a secondary selection target according to some aspects of the current disclosure.

FIG. 13 illustrates a flow diagram 1300 for matching an eye tracking vector to a secondary selection target according to some aspects of the current disclosure. As described above, the method of flow diagram 1300 uses the magnitude to determine whether selection of a secondary target was intended, and if so, the angle is used to determine which secondary target was selected. The method can be implemented by any process that is tasked with ascertaining which secondary target is selected, if any, by the user such as 404 and/or 406 of FIG. 4.

The method begins at operation 1302 and proceeds to operation 1304 where the method receives the magnitude and angle of the eye tracking vector under consideration. Execution then proceeds to operation 1306.

Operation 1306 determines whether the magnitude is consistent with an intent to make a secondary target selection. This can be determined by comparing the magnitude with a lower threshold, an upper threshold, or both. For example, a magnitude that is too short indicates that the user has not followed one of the animated secondary selection targets to its new location. On the other hand, a magnitude that is too long indicates that the user has moved their eyes away from the animated secondary selection targets.

What is too short and/or what is too long can be ascertained by the length of the secondary target animation, the distance to other items on the screen, and/or the noise characteristics of the eye tracking subsystem. For example, if the true distance between the initial location and new location of the secondary selection target is 0.5 inches, some shorter/longer error band can be identified by the error characteristics of the eye tracking subsystem. The specified error characteristics of the eye tracking subsystem determine how far off such vector magnitude is likely to be. Additionally, or alternatively, if the magnitude of the vector is longer than the animation distance and is consistent with another item on the screen, then it is likely the user did not intend to select a secondary selection target. For example, in the keyboard layout of FIGS. 7-10, if the magnitude of the vector extends from one primary selection target to another and it longer than the animation distance, then it is likely the user intended to select another primary selection target and not a secondary selection target.

Although not shown in the embodiment of FIG. 13, angle can also be used to show intent. If the angle is not close to any of the animated secondary selection targets, then the use did not likely intend to select a secondary target. For example, if there are two animated targets moving at 90 and 270 degrees, respectively, and the angle of the vector is close to 180 or 0 degrees, it is likely that no selection of secondary targets is intended.

Where no selection is likely, the "no" branch is taken and the method can end at operation 1314. If the magnitude and/or angle indicate that selection of a secondary target is likely, the "yes" branch is taken to operation 1308 where the angle closest to the eye vector angle is identified. Operation 1310 then identifies as the selected secondary target as the target associated with the closest angle to the vector angle.

The identified target is then output at operation 1312 and the method ends at operation 1314.

Example Machine Architecture and Machine-Readable Medium

Figure 14:
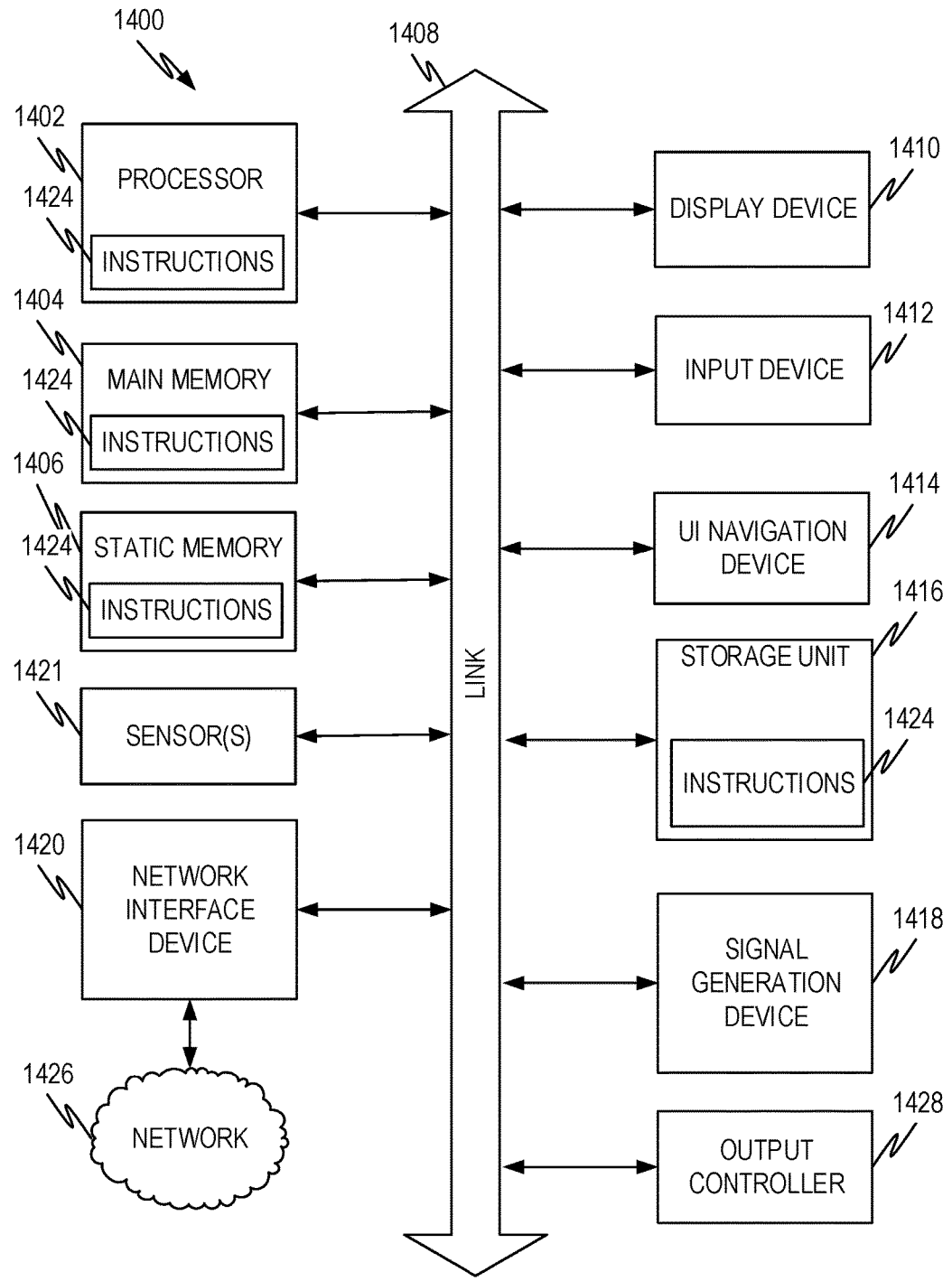
FIG. 14 illustrates a representative machine architecture suitable for implementing the systems and other aspects disclosed herein or for executing the methods disclosed herein.

FIG. 14 illustrates a representative machine architecture suitable for implementing the systems and other aspects disclosed herein or for executing the methods disclosed herein. The machine of FIG. 14 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 14 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1400 includes at least one processor 1402 (e.g., a central processing unit (CPU), a graphics processing unit (GPU), advanced processing unit (APU), or combinations thereof), one or more memories such as a main memory 1404, a static memory 1406, or other types of memory, which communicate with each other via link 1408. Link 1408 may be a bus or other type of connection channel. The machine 1400 may include further optional aspects such as a graphics display unit 1410 comprising any type of display. The machine 1400 may also include other optional aspects such as an alphanumeric input device 1412 (e.g., a keyboard, touch screen, and so forth), a user interface (UI) navigation device 1414 (e.g., a mouse, trackball, touch device, and so forth), a storage unit 1416 (e.g., disk drive or other storage device(s)), a signal generation device 1418 (e.g., a speaker), sensor(s) 1421 (e.g., global positioning sensor, accelerometer(s), microphone(s), camera(s), an eye tracking subsystem, and so forth), output controller 1428 (e.g., wired or wireless connection to connect and/or communicate with one or more other devices such as a universal serial bus (USB), near field communication (NFC), infrared (IR), serial/parallel bus, etc.), and a network interface device 1420 (e.g., wired and/or wireless) to connect to and/or communicate over one or more networks 1426.

Executable Instructions and Machine-Storage Medium

The various memories (i.e., 1404, 1406, and/or memory of the processor(s) 1402) and/or storage unit 1416 may store one or more sets of instructions and data structures (e.g., software) 1424 embodying or utilized by any one or more of the methodologies or functions described herein. These instructions, when executed by processor(s) 1402 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method for item selection using eye gaze, comprising:
rendering at least one primary selection target;
rendering a secondary selection target within a threshold distance of at least one of the primary selection targets;
identifying a user gaze selection of one of the primary selection targets;
responsive to user gaze selection of one of the primary selection targets, animating the secondary selection target to change the secondary selection target from an initial location to a new location;
identifying a vector having a length and a direction proportional to motion of a user's eye;
determining whether the vector corresponds to the secondary selection target; and
responsive to determining that the vector corresponds to the secondary selection target, identifying selection of the secondary selection target.

Example 2

The method of example 1 wherein the threshold distance places the secondary selection target within a foveal, central or paracentral vision region when the user gazes at the primary selection target.

Example 3

The method of example 1 wherein the animation comprises:
  removing the secondary selection target from a display screen; and
  rendering the secondary selection target at the new location on the display screen.

Example 4

The method of example 3 wherein the new location is outside of a threshold distance from the initial location.

Example 5

The method of example 1 wherein rendering the secondary selection target occurs after identifying user gaze selection of one of the primary selection targets.

Example 6

The method of example 1 further comprising:
  rendering a plurality of primary selection targets;
  rendering additional secondary selection targets such that a plurality of secondary selection targets are rendered within a threshold distance of at least some of the plurality of primary selection targets.

Example 7

The method of example 1 further comprising rendering additional secondary selection targets such that a plurality of secondary selection targets are rendered within a threshold distance of the at least one primary selection target.

Example 8

The method of example 1 further comprising:
  rendering additional secondary selection targets such that a plurality of secondary selection targets are rendered within a threshold distance of the at least one primary selection target;
  responsive to identifying selection of the secondary selection target, removing the plurality of secondary selection targets and rendering the at least one primary selection target;
  rendering the secondary selection targets at the new locations of the secondary selection targets;
  identifying a second vector having a length and a direction corresponding to motion of a user's eye;
  determining whether the second vector corresponds to one of the plurality of secondary selection targets; and
  responsive to determining that the vector corresponds to one of the plurality of secondary selection targets, identifying selection of the corresponding secondary selection target.

Example 9

The method of example 1, 2, 3, 4, 5, 6, 7 or 8, wherein the secondary selection target is based on one or more previously selected primary selection targets, one or more previously selected secondary selection targets, or a combination of previously selected primary and secondary selection targets.

Example 10

A system comprising a processor and computer executable instructions, that when executed by the processor, cause the system to perform acts comprising:
  rendering at least one primary selection target;
  rendering a secondary selection target within a threshold distance of at least one of the primary selection targets;
  identifying a user gaze selection of one of the primary selection targets;
  responsive to user gaze selection of one of the primary selection targets, animating the secondary selection target to change the secondary selection target from an initial location to a new location;
  identifying a vector having a length and a direction proportional to motion of a user's eye;
  determining whether the vector corresponds to the secondary selection target; and
  responsive to determining that the vector corresponds to the secondary selection target, identifying selection of the secondary selection target.

Example 11

The system of example 10 wherein the threshold distance places the secondary selection target within a foveal, central or paracentral vision region when the user gazes at the primary selection target.

Example 12

The system of example 10 wherein the animation comprises:
  removing the secondary selection target from a display screen; and
  rendering the secondary selection target at the new location on the display screen.

Example 13

The system of example 12 wherein the new location is outside of a threshold distance from the initial location.

Example 14

The system of example 10, 11, 12, or 13 wherein rendering the secondary selection target occurs after identifying user gaze selection of one of the primary selection targets.

Example 15

The system of example 10 further comprising:
  rendering a plurality of primary selection targets;
  rendering additional secondary selection targets such that a plurality of secondary selection targets are rendered within a threshold distance of at least some of the plurality of primary selection targets.

Example 16

A computer implemented method for item selection using eye gaze, comprising:
  rendering at least one primary selection target;
  rendering a secondary selection target within a threshold distance of at least one of the primary selection targets;
  identifying a user gaze selection of one of the primary selection targets;

responsive to user gaze selection of one of the primary selection targets, animating the secondary selection target to change the secondary selection target from an initial location to a new location;
identifying a vector having a length and a direction proportional to motion of a user's eye;
determining whether the vector corresponds to the secondary selection target; and
responsive to determining that the vector corresponds to the secondary selection target, identifying selection of the secondary selection target.

Example 17

The method of example 16 wherein the threshold distance places the secondary selection target within a foveal, central or paracentral vision region when the user gazes at the primary selection target.

Example 18

The method of example 16 or 17 wherein the animation comprises:
removing the secondary selection target from a display screen; and
rendering the secondary selection target at the new location on the display screen.

Example 19

The method of example 18 wherein the new location is outside of a threshold distance from the initial location.

Example 20

The method of example 16, 17, 18, or 19 wherein rendering the secondary selection target occurs after identifying user gaze selection of one of the primary selection targets.

Example 21

The method of example 16, 17, 18, 19, or 20 further comprising:
rendering a plurality of primary selection targets;
rendering additional secondary selection targets such that a plurality of secondary selection targets are rendered within a threshold distance of at least some of the plurality of primary selection targets.

Example 22

The method of example 16, 17, 18, 19, 20, or 21 further comprising rendering additional secondary selection targets such that a plurality of secondary selection targets are rendered within a threshold distance of the at least one primary selection target.

Example 23

The method of example 16, 17, 18, 19, 20, 21, or 22 further comprising:
rendering additional secondary selection targets such that a plurality of secondary selection targets are rendered within a threshold distance of the at least one primary selection target;
responsive to identifying selection of the secondary selection target, removing the plurality of secondary selection targets and rendering the at least one primary selection target;
rendering the secondary selection targets at the new locations of the secondary selection targets;
identifying a second vector having a length and a direction corresponding to motion of a user's eye;
determining whether the second vector corresponds to one of the plurality of secondary selection targets; and
responsive to determining that the vector corresponds to one of the plurality of secondary selection targets, identifying selection of the corresponding secondary selection target.

Example 24

The method of example 16, 17, 18, 19, 20, 21, 22, or 23 wherein the secondary selection target is based on one or more previously selected primary selection targets, one or more previously selected secondary selection targets, or a combination of previously selected primary and secondary selection targets.

Example 25

The method of example 16, 17, 18, 19, 20, 21, 22, 23, or 24 wherein the secondary selection target is animated along a path away from the primary selection target.

Example 26

The method of example 16, 17, 18, 19, 20, 21, 22, 23, 24, or 25 further comprising:
rendering additional primary selection targets such that a plurality of primary targets are rendered;
rendering additional secondary selection targets such that a plurality of secondary selection targets are rendered within a threshold distance of at least one of the plurality of primary selection targets;
responsive to the selection of the secondary selection target, replacing at least one of the plurality of secondary selection targets.

Example 27

The method of example 16, 17, 18, 19, 20, 21, 22, 23, 24, 25, or 26, further comprising:
rendering additional primary selection targets such that a plurality of primary targets are rendered;
rendering additional secondary selection targets such that a plurality of secondary selection targets are rendered proximate of at least one of the plurality of primary selection targets;
responsive to the selection of the secondary selection target, replacing one or more of the plurality of secondary selection targets with a corresponding new secondary selection targets.

Example 28

The method of example 27 wherein the corresponding new secondary selection targets are based on one or more previously selected primary selection targets, one or more previously selected secondary selection targets, or a combination of previously selected primary and secondary selection targets.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method for item selection using eye gaze, comprising:
rendering at least one primary selection target;
rendering a secondary selection target within a threshold distance of at least one of the primary selection targets;
identifying a user gaze selection of one of the primary selection targets;
responsive to user gaze selection of one of the primary selection targets, animating the secondary selection target to change the secondary selection target from an initial location to a new location;
identifying a vector having a length and a direction proportional to motion of a user's eye;
determining whether the vector corresponds to the secondary selection target; and
responsive to determining that the vector corresponds to the secondary selection target, identifying selection of the secondary selection target.

2. The method of claim 1 wherein the threshold distance places the secondary selection target within a foveal, central or paracentral vision region when the user gazes at the primary selection target.

3. The method of claim 1 wherein the animation comprises:
removing the secondary selection target from a display screen; and
rendering the secondary selection target at the new location on the display screen.

4. The method of claim 3 wherein the new location is outside of a threshold distance from the initial location.

5. The method of claim 1 wherein rendering the secondary selection target occurs after identifying user gaze selection of one of the primary selection targets.

6. The method of claim 1 further comprising:
rendering a plurality of primary selection targets;
rendering additional secondary selection targets such that a plurality of secondary selection targets are rendered within a threshold distance of at least some of the plurality of primary selection targets.

7. The method of claim 1 further comprising rendering additional secondary selection targets such that a plurality of secondary selection targets are rendered within a threshold distance of the at least one primary selection target.

8. The method of claim 1 further comprising:
rendering additional secondary selection targets such that a plurality of secondary selection targets are rendered within a threshold distance of the at least one primary selection target;
responsive to identifying selection of the secondary selection target, removing the plurality of secondary selection targets and rendering the at least one primary selection target;
rendering the secondary selection targets at the new locations of the secondary selection targets;
identifying a second vector having a length and a direction corresponding to motion of a user's eye;
determining whether the second vector corresponds to one of the plurality of secondary selection targets; and
responsive to determining that the vector corresponds to one of the plurality of secondary selection targets, identifying selection of the corresponding secondary selection target.

9. The method of claim 1 wherein the secondary selection target is based on one or more previously selected primary selection targets, one or more previously selected secondary selection targets, or a combination of previously selected primary and secondary selection targets.

10. A system comprising a processor and computer executable instructions, that when executed by the processor, cause the system to perform acts comprising:
rendering at least one primary selection target;
rendering a secondary selection target within a threshold distance of at least one of the primary selection targets;
identifying a user gaze selection of one of the primary selection targets;
responsive to user gaze selection of one of the primary selection targets, animating the secondary selection target to change the secondary selection target from an initial location to a new location;
identifying a vector having a length and a direction proportional to motion of a user's eye;
determining whether the vector corresponds to the secondary selection target; and
responsive to determining that the vector corresponds to the secondary selection target, identifying selection of the secondary selection target.

11. The system of claim 10 wherein the threshold distance places the secondary selection target within a foveal, central or paracentral vision region when the user gazes at the primary selection target.

12. The system of claim 10 wherein the animation comprises:
removing the secondary selection target from a display screen; and
rendering the secondary selection target at the new location on the display screen.

13. The system of claim 12 wherein the new location is outside of a threshold distance from the initial location.

14. The system of claim 10 wherein rendering the secondary selection target occurs after identifying user gaze selection of one of the primary selection targets.

15. The system of claim 10 further comprising:
rendering a plurality of primary selection targets;
rendering additional secondary selection targets such that a plurality of secondary selection targets are rendered within a threshold distance of at least some of the plurality of primary selection targets.

16. The system of claim 10 further comprising rendering additional secondary selection targets such that a plurality of secondary selection targets are rendered within a threshold distance of the at least one primary selection target.

17. The system of claim 10 wherein the acts further comprise:
rendering additional secondary selection targets such that a plurality of secondary selection targets are rendered within a threshold distance of the at least one primary selection target;
responsive to identifying selection of the secondary selection target, removing the plurality of secondary selection targets and rendering the at least one primary selection target;
rendering the secondary selection targets at the new locations of the secondary selection targets;
identifying a second vector having a length and a direction corresponding to motion of a user's eye;
determining whether the second vector corresponds to one of the plurality of secondary selection targets; and
responsive to determining that the vector corresponds to one of the plurality of secondary selection targets, identifying selection of the corresponding secondary selection target.

18. The system of claim 10 wherein the secondary selection target is based on one or more previously selected primary selection targets, one or more previously selected secondary selection targets, or a combination of previously selected primary and secondary selection targets.

19. A computer storage medium comprising executable instructions that, when executed by a processor of a machine, cause the machine to perform acts comprising:
render a plurality of primary selection targets;
identify user gaze selection of one of the primary selection targets;
responsive to user gaze selection of one of the primary section targets, render a secondary selection target within a threshold distance of the selected primary selection target;
animate the secondary selection target to change the secondary selection target from an initial location to a new location;
identify a vector having a length and a direction proportional to motion of a user's eye;
determine whether the vector corresponds to the secondary selection target; and
responsive to determining that the vector corresponds to the secondary selection target, identify selection of the secondary selection target.

20. The medium of claim 19 wherein the secondary selection target is animated along a path away from the primary selection target.

\* \* \* \* \*